3,397,191
FLUOROCARBON ETHERS
Richard Beckerbauer, Wilmington, Del., assignor to E. I. du Pont de Nemours and Company, Wilmington, Del., a corporation of Delaware
No Drawing. Filed June 2, 1965, Ser. No. 461,611
18 Claims. (Cl. 260—80.3)

ABSTRACT OF THE DISCLOSURE

Divinyl fluorocarbon ethers of the formulas $$CF_2=CF-O(CF_2CF_2O)_nCF=CF_2$$

and $$CF_2=CF-O(CF_2)_mO-CF=CF_2$$

wherein $n$ and $m$ are integers, including mixtures thereof, of from 2 to 20 can be converted into a divinyl oligomer of said divinyl ethers of the formulas

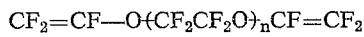

and

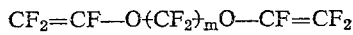

respectively, wherein $x$ is an integer of from 1–10 by heating said divinyl ether at a temperature of about 100–200° C. in an inert atmosphere under pressure of 1000–5000 atmospheres under conditions which minimize the presence of free radicals. The divinyl fluorocarbon ether oligomers produced can be reacted to form a highly crosslinked thermoset resin.

---

This invention relates to novel fluorocarbon ether compositions.

These compositions are the liquid reaction products obtained by heating a divinyl ether, preferably in liquid form, of the formula (1)
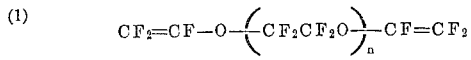

or (2)
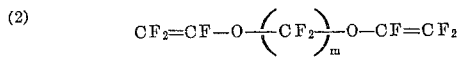

wherein $n$ and $m$ are integers, including mixtures thereof, of from 2–20, in an inert atmosphere under pressure of 1000–5000 atmospheres and at about 100–200° C. under conditions which minimize the presence of free radicals which may be derived from impurities in the reaction system or from the divinyl ethers. The resultant liquid reaction product is a viscous syrup at ambient temperature and contains a mixture of the divinyl ether reactant and its respective oligomer product, of the formula (3)
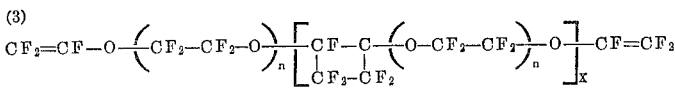

and (4)
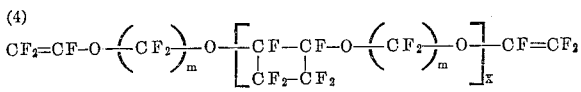

respectively, wherein $x$ is an integer of from 1–10. Further composition of the present invention include homopolymers of the oligomers, copolymers of the oligomers with the divinyl esters of Formula 1 or 2, and copolymers of the divinyl ethers of Formulae 1 and 2.

Referring to the reaction involving the divinyl ethers, it has been found that when these materials are heated under the conditions described, the liquid divinyl ether thickens with the passage of time until it becomes a viscous syrup. At this point, the reaction is preferably halted. If the divinyl ethers are heated under the same conditions in the presence of free radicals, they will polymerize to highly crosslinked hard thermoset resins. By virtually excluding the presence of free radicals, this result is avoided; and, the syrup reaction products containing the oligomer corresponding to the divinyl ether reactant is obtained instead.

An advantageous method for obtaining this result is to conduct the heating step in the presence of an inhibitor of free radical polymerization. Examples of such inhibitors include methylene fluoride, ethylene glycol dimethyl ether (glyme), and nitric oxide. Whether or not an inhibitor is needed can be determined by heating a particular sample of divinyl ether under the conditions specified. Formation of a solid instead of syrup reaction product indicates either the need for purification of the reaction systems or the need for a free-radical polymerization inhibitor. The amount of inhibitor employed, if any, will depend on the particular sample of divinyl ether to be treated and the particular inhibitor to be used and as such can be determined by routine experimentation. As a guide, from 0.1 to 0.3% of glyme based on the weight of the divinyl ether has been found to be useful. Smaller amounts of glyme generally do not prevent the divinyl ether from crosslinking to a solid infusible mass. In the case of methylene fluoride ($CH_2F_2$), from 17 to 100% of this compound based on the weight of the divinyl ether has generally been required.

The presence of the oligomer in the syrupy reaction product is confirmed by NMR and IR analyses which show the presence of the cyclobutane structure. Pertinent in this respect is a strong IR band at $10.35\mu$ and NMR bands ($CCl_3F$ reference standard and 56.4 megacycles) at 136 p.p.m., 146.3 p.p.m., and 149.1 p.p.m. A small amount of oligomer, i.e. less than 5 wt. percent of the amount of oligomer formed, may have the 1,3- cyclobutane structure instead of the 1,2-structure shown in Formulae 3 and 4.

The relative amounts of unconverted divinyl ether and corresponding oligomer in the reaction product syrup of this invention can be varied over wide limits according to the properties desired for its end use. Aside from controlling the reaction conditions to obtain a certain proportion of conversion, further control is possible by subsequently distilling off a desired portion or all of the unconverted divinyl ether. Thusly, the ligomer can be isolated from the syrup. In general, however, the syrup will be used as a mixture of unconverted divinyl ether and corresponding oligomer, with from 5 to 90% by weight of the divinyl ether being converted to its respective oligomer.

Generally, the value for $x$ increases with the amount of conversion of the divinyl ether to the corresponding oligomer.

The syrups of this invention, the oligomers by themselves, and monomer mixtures of the divinyl ethers of Equations 1 and 2 are all polymerizable by the free radical mechanism in a liquid medium which can be water or an inert perfluorinated solvent. Preferably, however, the polymerization is carried out in bulk. The polymerization occurs through addition to the vinyl groups of the particular monomer or mixtures thereof employed.

Suitable free radical initiators include benzoyl peroxide and t-butyl peroxide. Preferred, however, are the initiators which give rise to thermally stable and chemically inert polymer end groups such as trifluoromethyl peroxide, perfluoroazo compounds, $N_2F_2$, and ultra-violet light.

Especially preferred initiators are

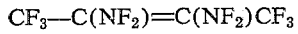

$$CF_3\text{—}C(NF_2)\text{=}C(NF_2)CF_3$$

or $CF_3\text{—}C(NF_2)\text{=}C(NF_2)C_4F_9$ used in a catalytic amount at a polymerization temperature of 60 to 90° C. The initiator $CF_3\text{—}C(NF_2)\text{=}C(NF_2)CF_3$ can be prepared as follows: To a "Hastelloy" C-lined shaker tube with a volume equal to that of 80 parts by weight of water are charged 10 parts by weight of hexafluoro-2-butyne ($CF_3\text{—}C\equiv C\text{—}CF_3$) and 11.7 parts of $N_2F_4$. The tube is heated at 170° C. for one hour with shaking. The resultant reaction mixture is distilled into a cylinder cooled at $-196°$ C., and unreacted starting materials are volatilized from the mixture at $-78°$ C., after which the liquid residue amounts to 15.9 parts consisting of greater than 90% of $CF_3\text{—}C(NF_2)\text{=}C(NF_2)CF_3$ which can be used as such or can be further purified by distillation or gas chromatography. The initiator $$CF_3(NF_2)\text{=}C(NF_2)C_4F_9$$

can be similarly prepared by using $CF_3\text{—}C\equiv C\text{—}C_4F_9$ as the acetylenic reactant.

The exact polymerization conditions employed will vary depending upon the monomer and initiator employed. Since the monomers are liquid, the polymerization is carried out at atmospheric or autogenous pressures. The polymerization temperatures can range from 20 to 250° C., preferably by heating in several stages and progressively raising the temperature in each stage.

The polymers obtained by polymerizing the syrup, oligomer, or co-divinyl ethers are highly crosslinked thermoset resins, as confirmed by the disappearance of the 5.45μ vinyl ether band from the IR spectrum, and accordingly, are useful as casting resins, coating resins, potting resins, and adhesives, especially in applications involving high temperatures or corrosive environments. The resins are generally hard and tough with the exception that softer polymer, suitable for caulking and the like, may be obtained from homopolymers of the oligomers, particularly at high values for $x$, which therefore preferably is essentially from 1 to 5. Likewise, hardness decreases as $n$ and $m$ increase; and, therefore, it is preferred that $m$ and $n$ are essentially from 2 to 5. IR and NMR analyses confirm the presence of the cyclobutane structure in the thermosets derived from the syrups and oligomers of this invention.

The syrups of this invention have the advantage of lower volatility than the divinyl ethers of Formulae 1 and 2 and thus are particularly useful for casting and potting. The resultant thermosetting resin generally has increased toughness and strength, and reduced heat of polymerization over resins formed directly from the divinyl ethers. Of utmost importance insofar as encapsulation of electrical components is concerned, there is significantly lower shrinkage involved when the resin is prepared by polymerization of the syrup than when it is obtained directly from the divinyl ethers or mixtures thereof. Thus, the syrups yield encapsulations which are chemically inert, hard, and non-porous. Polymerization at 70–90° C. with the perfluoroamino compounds previously named is preferred for obtaining these ideal results. As previously explained, the hardness of the resultant thermoset resin can be reduced, and not at the expense of toughness, by employing divinyl ethers having average $n$ and $m$ values greater than 2, e.g. 4–5, which are carried over into the oligomer, and/or by controlling the degree of conversion to oligomer.

With respect to the starting materials used in this invention, the divinyl ether of Formula 1 is prepared by mixing together under anhydrous conditions in a 2:1 molar basis, hexafluoropropylene epoxide with a diacyl fluoride of the formula (5) 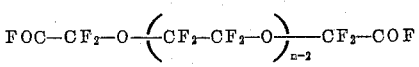

$$FOC\text{—}CF_2\text{—}O\text{—}(CF_2\text{—}CF_2\text{—}O)_{n-2}\text{—}CF_2\text{—}COF$$

wherein $n$ is an integer, including mixtures thereof, of 2–20, and a catalytic amount, e.g. 0.01 to 5.0% of the weight of the epoxide, of an alkali metal fluoride, e.g. CsF, in an inert polar solvent at from $-80$ to 150° C., pyrolyzing at from 220 to 350° C. the resultant etherified diacid fluoride in contact with sodium carbonate, and obtaining as a result thereof the divinyl ether of Formula 1. The diacyl fluoride of Formula 5 is prepared by reacting tetrafluoroethylene epoxide with oxalyl fluoride at a temperature from $-80$ to $+50°$ C. in sufficient inert solvent, such as methylene chloride or glyme to maintain the reaction system liquid containing from 0.001 to 5 wt. percent based on the weight of the solvent of quaternary ammonium fluoride such as trimethylcetyl ammonium fluoride or tetraethyl ammonium fluoride formed in situ by adding the corresponding cyanide to the reaction system. After removal of unreacted materials, the diacyl fluoride product is recovered by distillation. The value for $n$, which is an integer, in the diacyl fluoride will depend on the relative amounts of the fluoride and epoxide employed and can be controlled accordingly. For example, if one mole of oxalyl fluoride is reacted with five moles of tetrafluoroethylene epoxide, the major reaction product contains in the same ratio segments derived from these materials, wherein the $n$ value in Formula 5 would be 6. The minor reaction product contains compounds having an $n$ value varying in a narrow range from $n=6$ value and can be separated from the major product, if desired, by distillation. These minor reaction products need not be so separated, however, whereby the diacyl fluoride starting material will consist of fractions each having a different value for $n$.

The divinyl ethers of Formula 2 are described in U.S. Patent 3,114,778 to Fritz, Moore, and Selman, dated Dec. 17, 1963.

The following examples are illustrative of the invention. Parts and percents are by weight unless otherwise indicated.

EXAMPLE 1

0.5 ml. of $CF_2\text{=}CFOCF_2CF_2OCF\text{=}CF_2$ (the compound of Formula 2 where $m$ is 2) and 0.001 ml. of glyme were sealed under vacuum in a ⅜" x 8" platinum tube and heated at an external pressure of 5,000 atm. at 135° C. for 1 hr., then at 150° C. for 6 hr. The product was a viscous syrup containing about 4 parts of unreacted starting material and about 6 parts of oligomer of the formula

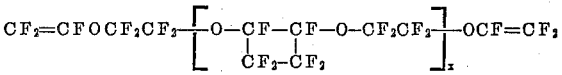

$$CF_2\text{=}CFOCF_2CF_2\text{—}\left[\text{O—CF—CF—O—}CF_2CF_2\right]_x\text{—}OCF\text{=}CF_2$$
$$\qquad\qquad\qquad\qquad\quad\; CF_3\text{—}CF_3$$

wherein $x$ is 1, 2, 3, 4, and small amounts of higher integers. About 70% of the oligomer was $x=1$ and less than 25% of it was $x=2$.

EXAMPLE 2

The monomer of Formula 1 where $n$ is 2 was reacted as in Example 1 to give a 50% conversion to the oligomer of Formula 3, which was primarily the dimer, i.e. $x$ equals 2. The density of the syrupy product was 1.76 gm./cm.³

EXAMPLE 3

The monomer of Formula 1 where $n$ is 3 was treated substantially as in Example 1 and 50% conversion to the oligomer of Formula 3 was obtained. The density of the syrupy product was about 1.75 gm./cm.³

EXAMPLE 4

The monomer of Formula 2 where $m$ is 5 was reacted substantially as in Example 1. In the resulting syrup, 10% of the starting monomer was converted to the oligomer of Formula 4 where $x$ is 2 was obtained.

EXAMPLE 5

Example 1 was repeated replacing the glyme inhibitor with 26%, based on the weight of the monomer of $CH_2F_2$. In the resulting syrup, 23% of the starting monomer was converted to the oligomer of Formula 4. 87% of the oligomer was dimer and 13% was trimer.

EXAMPLE 6

Example 3 was repeated replacing the glyme with $CH_2F_2$; the amount of $CH_2F_2$ used was equal in weight to the amount of monomer. In the resulting syrup, 8% of the starting monomer was converted to the oligomer of Formula 3 which was almost entirely dimer ($x=2$).

EXAMPLE 7

Example 1 was repeated in essentials except that 1.9 mole percent of NO was used in place of glyme to inhibit polymerization. The resultant syrup contained 54% of the oligomer of Formula 4 containing 52% by weight of $x=1$, 33% by weight of $x=2$, 9.5% by weight of $x=3$, and 4.7% by weight of $x=4$ as analyzed by vapor phase chromotography.

Density measurements on this and other syrups indicate the presence of oligomer wherein $x$ is greater than 4.

EXAMPLE 8

The syrup prepared in Example 1 was placed in an evacuated, sealed tube with 4 wt. percent of $$CF_3C(NF_2)=C(NF_2)CF_3$$

The tube was heated at 85° C. for 18 hours, followed by 125° C. for 6 hours. A clear, tough resin was obtained.

The syrups of Examples 2–6 were converted into resins in a similar manner. In addition, syrup prepared according to Example 3 was purged of monomer by heating at 60° C. under vacuum and the oligomer was homopolymerized.

EXAMPLE 9

From syrup prepared according to Example 7 was removed unconverted monomer by distillation at 50° C. under vacuum of about 1 mm. pressure. The density of the syrup before distillation was 1.73 gm./ml. and after distillation was 1.83 gm./ml. To the oligomer was added 4% by weight of $CF_3C(NF_2)=C(NF_2)CF_3$. The syrup was then heated in an inert atmosphere at 78° C. for 12 hours and quantitative polymerization to tough polymer was obtained.

EXAMPLE 10

Following the polymerization procedure of Example 8, 1.0 part of the divinyl ether of Formula 1 wherein $n=4$ was copolymerized with 2.0 parts of the divinyl ether of Formula 2 wherein $m=2$. The resultant copolymer was hard and inflexible. Instead of direct copolymerization of the divinyl ethers, the liquid monomer mixture can first be treated according to Example 1 to obtain a mixture of Formulae 3 and 4 oligomers as well as the resultant syrup polymerized to thermosetting resins containing units derived from Formulae 1, 2, 3, and 4. This invention also contemplates thermosetting resins containing other combinations of such units as will be recognized possible by those skilled in the art.

As many apparently satisfactorily different embodiments of this invention may be made without departing from the spirit and scope thereof, it is to be understood that this invention is not limited to the specific embodiments thereof except as defined in the appended claims.

What is claimed is:

1. A composition represented by the formula

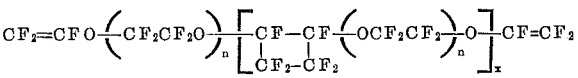

wherein $n$ is an integer of 2–20 and $x$ is an integer of 1–10.

2. A crosslinked thermoset homopolymer of the composition of claim 1 in which polymerization of said composition occurs through addition to both vinyl groups of said composition.

3. A composition represented by the formula

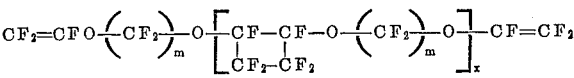

wherein $m$ is an integer of 2–20 and $x$ is an integer of 1–10.

4. A crosslinked thermoset homopolymer of the composition of claim 3 in which polymerization occurs through addition to both vinyl groups of said composition.

5. A free radical polymerizable liquid consisting essentially of oligomer having the formula

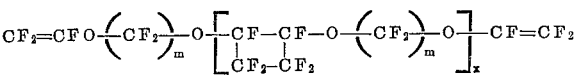

and divinyl ether having the formula

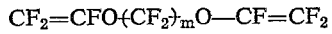

wherein $m$ is an integer of 2–20 and $x$ is an integer of 1–10.

6. A crosslinked thermoset polymer of the liquid of claim 5 in which polymerization occurs through addition to both vinyl groups of the divinyl compositions of which said liquid consists.

7. A free radical polymerizable liquid consisting essentially of oligomer having the formula

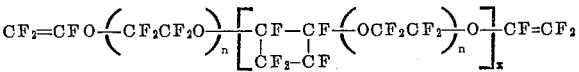

and divinyl ether having the formula

wherein $n$ is an integer of 2–20 and $x$ is an integer of 1–10.

8. A crosslinked thermoset polymer of the liquid of claim 7 in which polymerization occurs through addition to both vinyl groups of the divinyl compositions of which said liquid consists.

9. A process comprising heating at a temperature of 100 to 200° C. and pressure of 1000–6000 atmospheres in an inert atmosphere a divinyl ether in liquid form and having a formula selected from the group consisting of

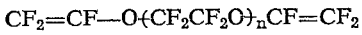

and

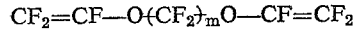

to convert at least a portion of said divinyl ether to the oligomer respectively having a formula selected from the group consisting of

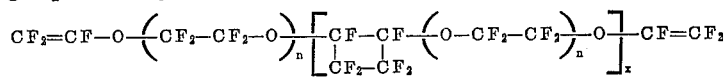

and

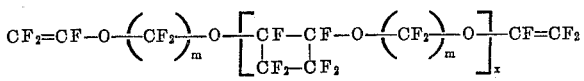

wherein $n$ and $m$ are integers of 2–20 and $x$ is an integer of 1–10.

10. The process of claim 9 and the additional step of recovering said oligomer from its respective unconverted divinyl ether.

11. The process of claim 9 in which the heating step is carried out in contact with a free-radical polymerization inhibitor.

12. A syrup which is cross-linkable to a thermoset resin, consisting essentially of at least one divinyl ether having the formula $$CF_2=CF-O(CF_2CF_2O)_nCF=CF_2$$

and $$CF=CF-O(CF_2)_mO-CF=CF_2$$

and at least one oligomer having the formula

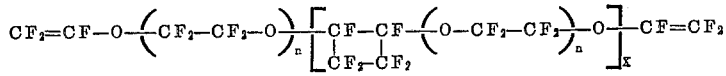

and

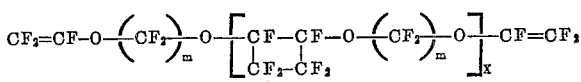

wherein $n$ and $m$ are integers of 2–20 and $x$ is an integer of 1–10.

13. The syrup of claim 12 wherein $n$ and $m$ are each integers of 2–5.

14. The syrup of claim 12 wherein $x$ is an integer of 1–5.

15. The syrup of claim 12 containing from 5 to 95% by weight of oligomer.

16. A crosslinked thermoset resin of the syrup of claim 12 in which polymerization occurs through addition to both vinyl groups of the divinyl compositions of which said liquid consists.

17. A free radical polymerizable liquid consisting essentially of a mixture of divinyl ethers having the formulae $$CF_2=CF-O(CF_2CF_2O)_nCF=CF_2$$

and $$CF_2=CF-O(CF_2)_mO-CF=CF_2$$

wherein $n$ and $m$ are integers of 2–20.

18. A crosslinked thermoset polymer of the liquid of claim 17 in which polymerization occurs through addition to both vinyl groups of the divinyl compositions of which said liquid consists.

References Cited

UNITED STATES PATENTS 3,310,606   3/1967   Fritz _____ 260—884

JOSEPH L. SCHOFER, *Primary Examiner.*

S. M. LEVIN, *Assistant Examiner.*